United States Patent [19]

Steele

[11] Patent Number: 5,345,969

[45] Date of Patent: Sep. 13, 1994

[54] SEAL IN HIGH PRESSURE PNEUMATIC BOOSTER VALVE

[75] Inventor: James R. Steele, Stillwater, Minn.

[73] Assignee: Dynamic Air, Inc., St. Paul, Minn.

[21] Appl. No.: 151,757

[22] Filed: Nov. 15, 1993

[51] Int. Cl.$^5$ .............................................. F16K 15/14
[52] U.S. Cl. ...................................... 137/853; 406/93
[58] Field of Search ...................... 137/853; 406/93–95

[56] References Cited

U.S. PATENT DOCUMENTS

| 2,621,889 | 12/1952 | Annin | 137/853 |
|---|---|---|---|
| 2,941,541 | 6/1960 | Peras | 137/853 X |
| 4,313,699 | 2/1982 | Steele | 137/853 X |
| 4,582,081 | 4/1986 | Fillman | 137/853 X |
| 4,708,535 | 11/1987 | Steele | 137/853 X |

Primary Examiner—Robert G. Nilson
Attorney, Agent, or Firm—Jacobson and Johnson

[57] ABSTRACT

A booster valve for a pneumatic conveying system is made with an annular seal made out of relatively thin rubber having a low tensile strength to thereby reduce the resistance or opposition to the flow of the booster air into the conveying line and the seal retainer is provided with supporting ribs for restraining movement of the seal to prevent the seal from exceeding its elastic limit which otherwise could occur due to a whipping action which occurs during high volumes of air flow through the booster valve. In addition, the booster valve has a large air-receiving chamber so that the input pressurized air is allowed to expand to thereby reduce the velocity of the air as it passes through the valve.

6 Claims, 2 Drawing Sheets

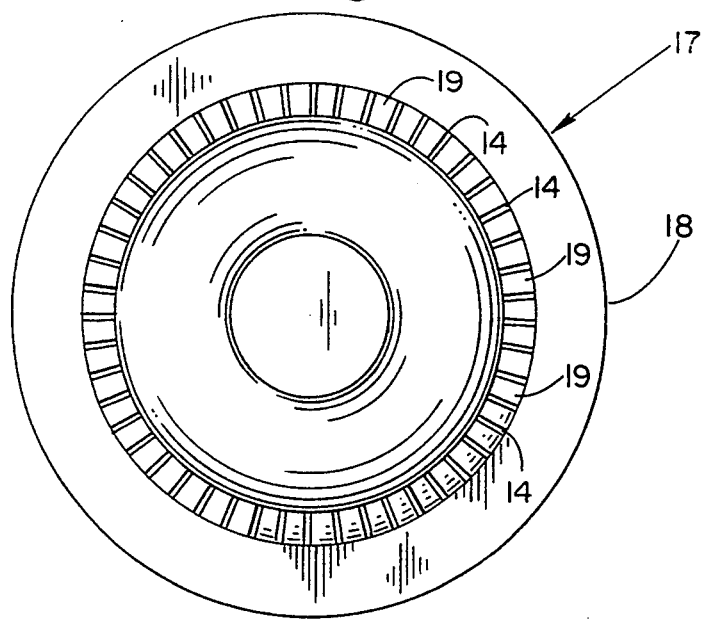
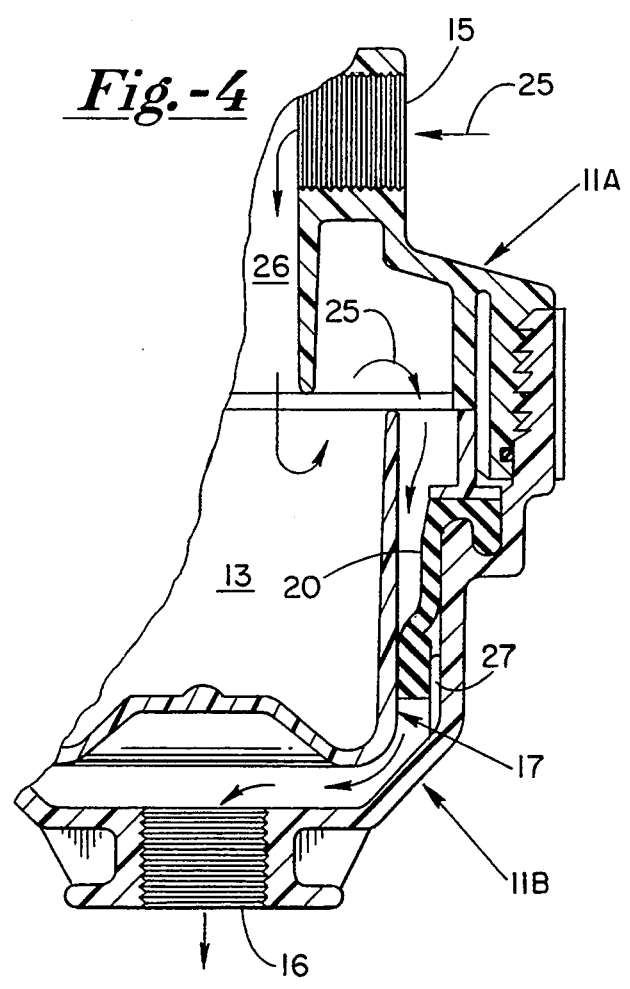

SEAL IN HIGH PRESSURE PNEUMATIC BOOSTER VALVE

FIELD OF THE INVENTION

This invention relates to booster valves which provide boosting air into pneumatic conveying lines. In general, a number of booster valves are located strategically at various positions along a pneumatic conveying line in order to provide the necessary boost in air pressure and volume.

DESCRIPTION OF THE PRIOR ART

One form of booster valve using a annular or sleeve-like seal or gasket is illustrated in U.S. Pat. No. 4,313,699 dated Feb. 2, 1982 by Steele. In this device the annular resilient rubber seal or sleeve flexes inwardly when the inlet pressure exceeds the outlet pressure to permit flow of air into the conveyor tube. The sleeve returns to its original sealing condition when the outlet pressure raises sufficiently. The seal prevents backflow of material from the conveyor tube into the booster valve and the air source.

Another booster valve is illustrated in U.S. Pat. No. 4,708,535 dated Nov. 24, 1987 by Steele which utilizes a elongated resilient annular seal or gasket around a solid plug and when the pressure at the inlet side exceeds the pressure at the outlet side, the seal expands or flexes away from the plug allowing air to flow from the inlet to the outlet and enter into the conveyor line. The seal prevents backflow into the booster valve.

Although the booster valves described above in the referenced prior art have worked satisfactorily, they are not as efficient as the industry desires. In general, the seals have been made of rubber which has a relatively high tensile strength in order to minimize damage to the seal. However, this results in the seal introducing a relatively high resistance to the air flow so that the pressure differential has to be relatively high before the booster valve is able to supply air to the conveyor.

SUMMARY OF THE INVENTION

The seal or sleeve of the instant invention operates or functions similar to that of the '535 patent in that the higher input pressure causes the sleeve or seal to expand or flex or move radially so that the air can flow generally axially from the inlet to the outlet opening and thence to the conveyor. However, in the present invention the inlet air is first directed into a relatively large chamber where the air expands and thereby reduces the velocity or rate of flow of the air to the outlet opening. The air then takes a somewhat tortuous path from the air inlet to the air outlet instead of the straight line path of the '535 patent. The seal is made of a relatively thin, low-tensile strength rubber so that it offers reduced resistance to the flow of air to the outlet thereby making it more efficient because it operates with a significantly reduced pressure differential between the inlet and outlet openings.

Because of the characteristics of the seal, it is subject to a whipping action during periods of significant air flow through the booster. This whipping action can produce forces which cause the seal to extend beyond its elastic limit and thereby become permanently damaged and ineffective as a seal. To prevent this or at least minimize this possibility, a series of ribs are spaced circumferentially on the interior of the seal retainer to provide mechanical support for the seal to prevent the whipping action and thereby minimize the possibility of damage to the seal.

As a further feature, air entering the valve is fed into a relatively large chamber within the booster valve so that the air expands and then travels at a reduced velocity to the air outlet. As a result, the seal is not deflected as far and thereby reduces wear and tear on the seal and improves its durability. In addition, if there are any contaminants carded by the incoming air, they are less likely to damage the booster valve or the seal because of the reduced velocity. Another incidental advantage of the latter is that a pressure meter can be coupled to the chamber to obtain an accurate pressure reading.

Yet another feature is that the retainer for the top edge of the seal or gasket has a series of radially extending ribs which form air vanes which the top edge of the gasket rests against so that the gasket is prevented from being pushed back into the chamber or into the valve in the event that the outlet pressure should exceed the inlet pressure by some substantial amount.

BRIEF DESCRIPTION OF THE DRAWINGS

FIG. 3 is an underside view of the cup-like member or element in the preferred embodiment of the invention; and FIG. 4 is a partial section view illustrating the air flow when the valve is operative.

DESCRIPTION OF THE PREFERRED EMBODIMENTS

Figure 1:
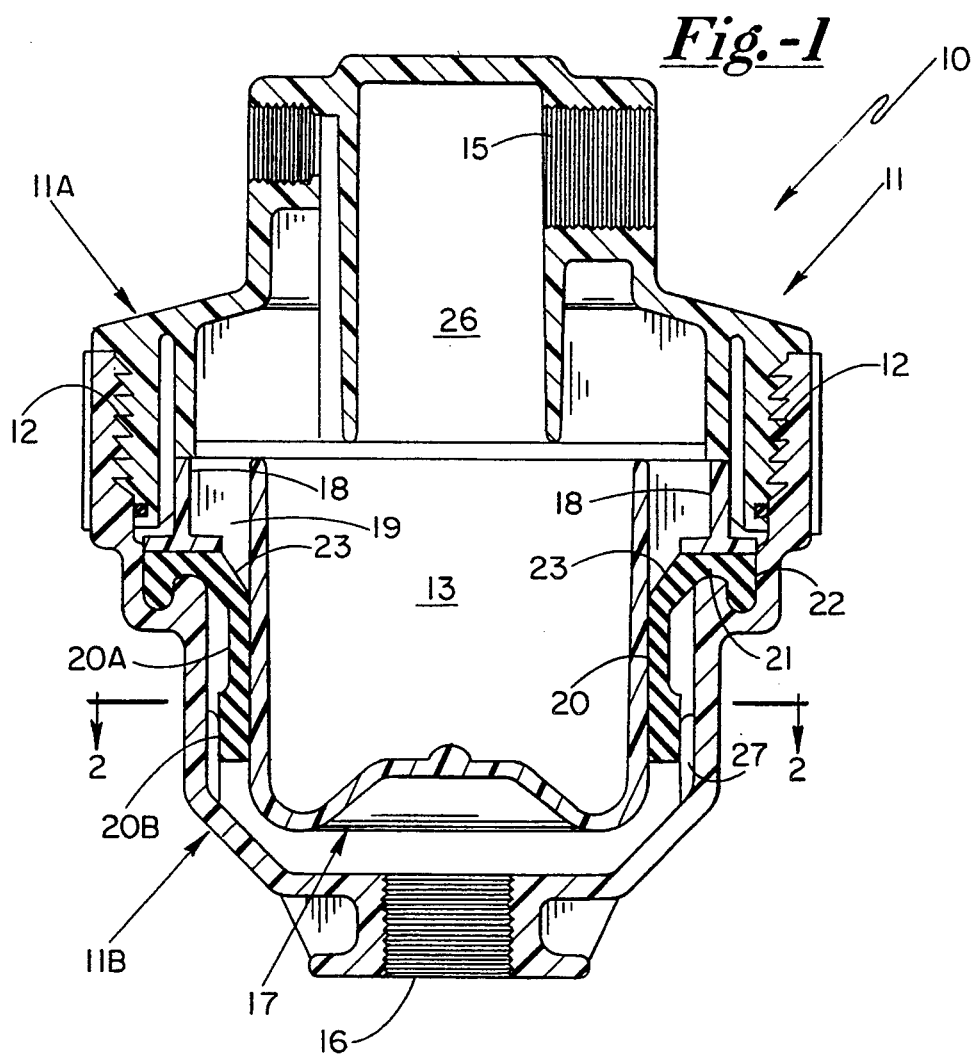
FIG. 1 is a vertical sectioned view of a preferred embodiment of the invention.
Figure 2:
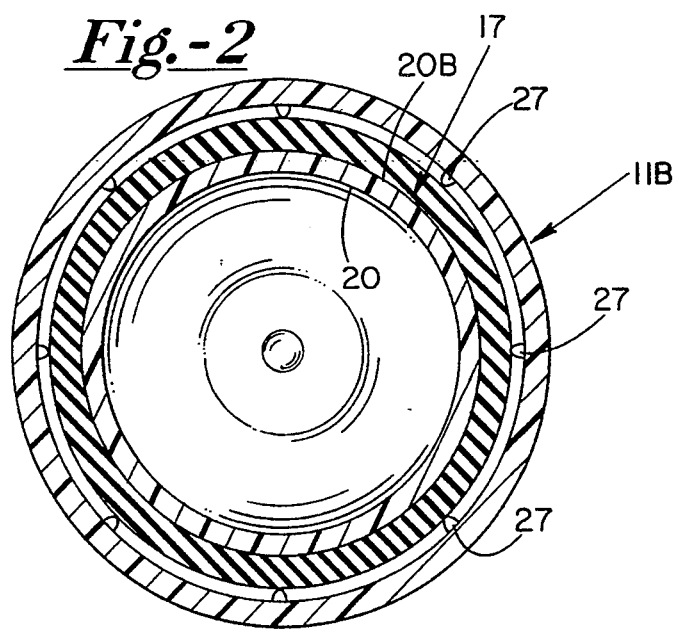
FIG. 2 is a horizontal section view taken along viewing line 2—2 of FIG. 1.

The aforementioned U.S. patents and other patents referenced therein suitably describe the purpose for and the manner of operation of air booster valves in pneumatic conveying systems. Briefly, in "dense phase" pneumatic conveying systems, with which this invention is primarily concerned, conduits or conveyor tubes are practically filled with the material being conveyed, usually a granular material, and the material is moved along slowly within the conveyor tubes by relatively small amounts of air. Air pressure is applied into the conveyor tubes at the source to move the material and at various locations along the conveyor tube to compensate for frictional losses. Booster valves are coupled to the conveyor tube or conduit to provide the additional air at the various locations along the conduit. Some booster valves are mounted to feed the booster air into the conveying line or conduit generally parallel to the direction of flow of the material while others, which is the case with the present invention, feed the air radially into the conveying tube so that the boosting air enters the conduit at about a right angle to the flow.

The air booster valve 10 of the present invention is generally cylindrically shaped and comprises a housing 11 made out of two sections which, for discussion purposes, are identified as upper section 11A and lower section 11B. Sections 11A and 11B are threaded together at 12 to form unitary housing 11. Housing 11 encloses a hollow chamber generally designated by reference numeral 13. Inlet pressurized air is fed into valve 10 radially through threaded inlet opening 15 by being coupled in some convenient fashion, not shown, to a suitable pressurized air source, not shown, and enters chamber 13 via axial passageway 26. Air exits axially from valve 10 through a threaded outlet opening 16 which generally is coupled in some convenient fashion, not shown, to a conveyor line or conduit to feed the air radially into the conveyor line.

Mounted within chamber 13 is a cup-like member generally identified by reference numeral 17. Member 17 is open on the top and is closed along the bottom and around its sides. At its upper edge or end member 17 has a circumferential outwardly extending annular rim or ridge 18 containing a series of spaced openings or vanes 19 through rim 18 formed by spaced apart ribs 14.

Surrounding the exterior of cup-like member 17 is an annular or sleeve-like resilient seal or gasket 20 which is normally biased m snugly engage the exterior of cuplike member 17, as illustrated in FIG. 1. The upper edge of seal 20 has a radially outwardly extending rim 21 which terminates in a downward protruding lip 22 which rests in a groove formed in housing member 11B. The inner edge of rim 21 is angled or sloped downward as illustrated at 23. Seal 20 is made out of a thin resilient rubber having a low tensile strength so that it will react to relatively low levels of air pressure differential without introducing a great deal of resistance to the air flow thereby allowing the seal or valve to operate in a more efficient manner than in the past. Typically, this material may be 50 Duro Buna-N having a thickness at its thinnest part, 20A, in the range of about ⅛ inch and at its lower edge, the thickest part, 20B, in the range of about 3/16th inch. The upper edge or rim 21 of seal 20 rests up against the underside of rim 18 of cup-like member 17 against ribs 14.

As illustrated in FIG. 4 by arrows 25, when the pressure at the inlet opening 15 exceeds the pressure at the air outlet opening 16 pressurized air enters valve 10 radially through inlet opening or port 15 and follows a somewhat tortuous or serpentine path through axial passageway generally identified by reference numeral 26 into enlarged hollow chamber 13 and the interior of cup-like member 17 then follows a path over the upper edge of cup-like member 17 through openings or vanes 19 in rim 18 to flex or deflect seal 20 radially outward from the outer surface of cup-like member 17 and travels along the outside of cup-like member 17 down to outlet port or opening 16 where it then enters the conveyor tube or conduit, not shown. When the pressure at outlet opening 16 exceeds or is equal to the pressure at the inlet opening 15, then seal 20 remains snugly or tightly engaged with the outer surface of cup-like member 17. This prevents any backflow of air from outlet opening 16 into chamber 13 of valve 10 and/or back to the air source through inlet opening 15. When the pressure at outlet opening 16 is greater than that at inlet opening 15, the pressure in the space between the interior of the lower half 11B of housing 11 and the exterior of seal 20 aids in keeping the latter tightly sealed against the exterior of cup-like member 17 to help prevent any backflow air into valve 10. The back pressure also acts on rim 21 of seal 20 seeking to drive it backwards or upwards, as viewed in FIG. 1, into the chamber 13. However, ribs 14 of vaned rim 18 of cup-like member 17 hold the top edge of seal 20 in place to prevent it from being pushed back into the valve while allowing air passage to the outlet opening when called for. Further, this back pressure acts on the top edge of seal 20 to more securely close off the openings or vanes 19 when the exit or outlet pressure is greater than the inlet pressure.

On the interior wall of lower housing member 11B opposite the lower end of seal 20 are a series of spaced-apart radially inwardly extending parallel ribs 27. Ribs 27 are dimensioned and located to rest against the exterior of the thick portions 20B of the seal 20. This provides a reinforcement or support for the lower section or lower portion 20B of seal 20 so that the seal is not subjected to a whipping action which otherwise could occur when using a resilient seal having a low tensile strength. The low tensile strength and the thinness of the seal provide the benefit of introducing a minimum amount of resistance to air flow in the right direction so that the valve will operate to introduce booster air at a lower pressure differential than has been the case in the past. However, a seal of this nature is subject to damage resulting from a whipping action. This whipping action occurs because the pressure differentials can and usually do vary at a rapid rate so that booster air is fed into the conveying line in spurts and at a relatively high rate or frequency which means that the seal is flexing back and forth at a rapid rate which is referred to as "whipping". Ribs 27 resting against the thick portions at the bottom edge of seal 20 prevent this whipping action from occurring because those sections of the thick section 20B of the seal in contact with the ribs 27 do not move (or move only slightly) and therefore do not flex back and forth. Only in the spaces between ribs 27 does seal 20 flex. In other words, the entire bottom edge of the seal does not flex back and forth, only in the areas between ribs 27. As a result, even if parts of seal 20 open and close at a relatively high frequency, other parts are held in place so that the forces acting on the seal during this condition are not great enough to exceed the tensile strength of the seal thereby damage to the seal is eliminated or at least minimized.

A threaded opening 30 in housing 11 opposite inlet opening 15 is provided for attaching a meter, not shown, for reading the pressure within valve 10. If the meter is not used, opening 30 is closed off with a suitable threaded plug, not shown.

The incoming air entering enlarged chamber 13 expands thereby reducing its velocity. As a result it is less likely to cause any damage to the component parts of the valve.

I claim:

1. A booster valve for providing pressurized air to a pneumatic conveyor, comprising:
    a) a generally cylindrical housing having an air inlet opening and an air outlet opening;
    b) a hollow chamber within said housing;
    c) a cuplike member located coaxially within said chamber with an air-flow space between said cuplike member and said housing, said cuplike member open at an end toward said air inlet opening and closed at the other end;
    d) an air inlet passageway providing air communication between said air inlet opening and said open end of said cuplike member into the interior of said cuplike member;
    e) an air outlet passageway providing air communication between said air outlet opening and said air-flow space;
    f) an air passageway from the open end of said cuplike member to said air-flow space; and
    g) a generally cylindrical resilient seal around the exterior of said cuplike member in said air-flow space, said seal biased to close off air flow in said air-flow space, said seal resiliently flexed radially outward to permit air flow from the open end of said cuplike member through said air-flow space when the air pressure at said chamber is greater than the air pressure at said air outlet passageway.

2. A booster valve as described in claim 1 wherein said seal is made of generally thin, low tensile strength rubber, characterized by having low resistance to air flow.

3. A booster valve as described in claim 2 further including:
   a plurality of spaced-apart ribs paralleling the axis of said cuplike member extending inward along the interior of said housing in contact with said seal for providing support for said seal.

4. A booster valve as described in claim 1 wherein the volume of said chamber is substantially greater than the volume of said inlet air passageway to allow inlet air to expand and thereby reduce the velocity of the air traveling to and through said air-flow space.

5. A booster valve as described in claim 3 wherein:
   said cuplike member has a radially outward extending rim containing air passageways therethrough;
   one edge of said seal resting against said rim for closing off said air passageways when the air pressure at said air outlet passageway is greater than the air pressure at said chamber.

6. A booster valve as described in claim 5 wherein said air passageways in said rim are formed by a multiplicity of radially extending ribs circumferentially spaced about said cuplike member, said ribs acting on said one edge of said seal to prevent said seal from moving into said chamber.

* * * * *